May 28, 1935.  O. CLAY  2,003,249
CASTER
Filed July 2, 1934
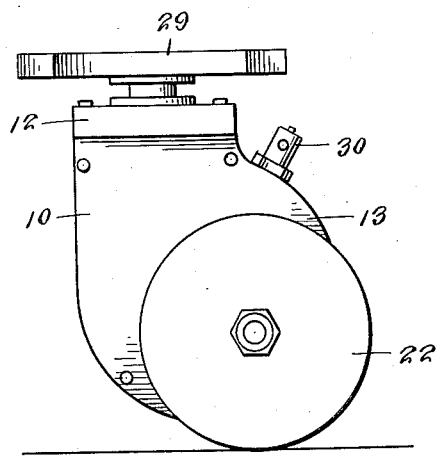
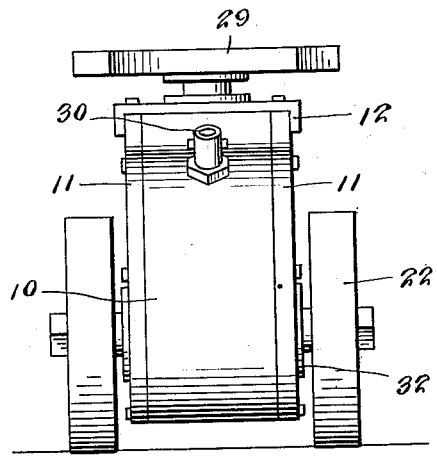
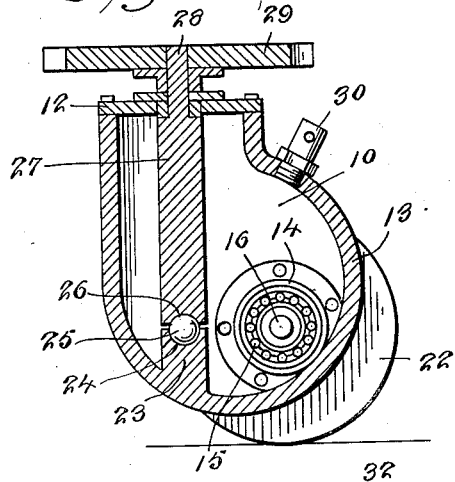
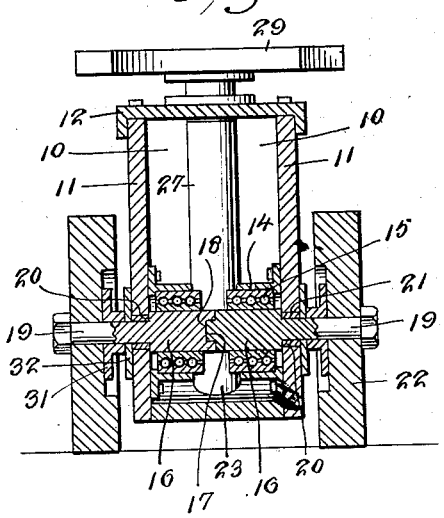
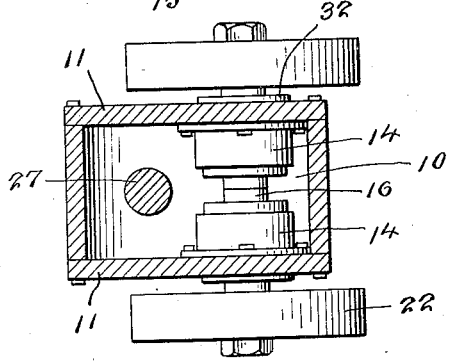
Oscar Clay INVENTOR
BY Victor J. Evans & Co.
ATTORNEY Patented May 28, 1935

2,003,249

UNITED STATES PATENT OFFICE 2,003,249

CASTER

Oscar Clay, South Bend, Ind.

Application July 2, 1934, Serial No. 733,507

2 Claims. (Cl. 16—36)

The invention relates to casters and more especially to the double wheel swiveled type of caster.

The primary object of the invention is the provision of a caster of this character, wherein the axles of the wheels thereof are independent of each other and interfitted one with the other, so that either wheel may turn free of the other and also lubricant as contained within the body of the caster for lubricating purposes will be prevented from leaking from said body.

Another object of the invention is the provision of a caster of this character, wherein the construction thereof is novel in form so as to prevent water seeping into the body of the caster or wetting the bearings thereof, and thus assuring longevity to the caster without respect to the wear or duty of the same, the caster being essentially for the dairy industry for mobile trucks, racks or the like.

A further object of the invention is the provision of a caster of this character which is simple in construction, thoroughly reliable and efficient in its purpose, sturdy, durable, susceptible of continued lubrication, and inexpensive to manufacture.

With these and other objects in view, the invention consists in the features of construction, combination and arrangement of parts as will be hereinafter more fully described in detail, illustrated in the accompanying drawing, which discloses the preferred embodiment of the invention, and pointed out in the claims hereunto appended.

In the accompanying drawing:

Figure 1 is a side elevation of a caster constructed in accordance with the invention.

Figure 2 is a front elevation thereof.

Figure 3 is a vertical sectional view through the caster.

Figure 4 is a view similar to Figure 3 taken at right angles thereto.

Figure 5 is a horizontal sectional view.

Similar reference characters indicate corresponding parts throughout the several views in the drawing.

Referring to the drawing in detail, the caster comprises a hollow body 10 having the removable side cheeks 11 and a cap or top 12, respectively, the body being formed with a rounded offset portion 13. Carried by the side cheeks 11 eccentric to the center of the rounded portion 13 of said body are bearing ball boxings 14 fitted with bearing balls 15, these being arranged about the inner ends of separably aligned axles 16, one being provided with a stud 17 and the other with a socket 18 therefor, so that the said axles 16, at their inner extremities, will be interfitted with each other. The outer journal ends 19 of said axles 16 are reduced to provide shoulders 20 which abut against bushings 21 fitted within the cheeks 11 and through which the journal ends 19 of said axles extend for accommodating wheels or rollers 22 rotatable upon said journal ends.

Formed interiorly of the body 10 to one side of the axles 16 is a vertical lug 23 having a ball seat 24 accommodating the bearing ball 25, this being also received in a seat 26 in a swivel stem 27 which has the reduced upper end 28 passed through the top 12 and carrying an attaching plate or head 29, so that the said swivel stem 27 can be made secure to a load. Thus it will be seen that the stem 27 rotates upon the ball 25 as fitted in the seats 24 and 26, respectively.

The body 10 constitutes a lubricant or grease cell or chamber and the same is filled through a filling nipple 30 as carried by said body.

Interposed between hub-like members 31 on the journal ends 19 and the cheeks 11 are washers 32 which serve to prevent leakage of lubricant about the journal ends 19 in the use of the caster.

What is claimed is:

1. A caster of the character described comprising a hollow body, a swivel stem vertically fitted within the body, a bearing ball supported within the body against which the swivel stem operates, a pair of axles fitted transversely of said body and having interfitted ends, wheels upon said axles and at opposite sides of the body, and bearing ball boxings arranged within the body and about said axles and having bearing balls.

2. A caster of the character described comprising a hollow body, a swivel stem vertically fitted within the body, a bearing ball supported within the body against which the swivel stem operates, a pair of axles fitted transversely of said body and having interfitted ends, wheels upon said axles and at opposite sides of the body, bearing ball boxings arranged within the body and about said axles and having bearing balls, an attaching head on said swivel stem, and an inlet nipple carried by the body for delivering lubricant interiorly of the latter.

OSCAR CLAY.